United States Patent [19]
Wolpert

[11] Patent Number: 5,535,301
[45] Date of Patent: Jul. 9, 1996

[54] METHOD FOR GUESSING THE RESPONSE OF A PHYSICAL SYSTEM TO AN ARBITRARY INPUT

[75] Inventor: David H. Wolpert, Santa Fe, N.M.

[73] Assignee: The United States of America as represented by the United States Department of Energy, Washington, D.C.

[21] Appl. No.: 366,413

[22] Filed: Dec. 30, 1993

Related U.S. Application Data

[63] Continuation-in-part of Ser. No. 35,326, Mar. 23, 1993, abandoned.

[51] Int. Cl.$^6$ .............................. G06F 15/18; G06E 1/00
[52] U.S. Cl. ................... 395/20; 395/22; 395/23; 395/27
[58] Field of Search ................ 395/20–27, 61, 395/12; 382/12–15, 155–159

[56] References Cited

U.S. PATENT DOCUMENTS

| | | | |
|---|---|---|---|
| 4,688,195 | 8/1987 | Thompson et al. | 395/12 |
| 4,984,176 | 1/1991 | Vanden Heuvel | 395/51 |

OTHER PUBLICATIONS

Feldman et al, "Example–guided optimization of recursive domain theories"; Proceedings. Seventh IEEE Conference on Artificial Intelligence Applications, pp. 240–244 24–28 Feb. 1991.
Yin et al, "A new Class of Nonlinear Filter"; IEEE Transactions on Signal Processing, vol. 41, No. 3 Mar. 1993. pp. 1201–1222.
Zeng et al, "A Unified Design method for rank order, . . . , Bayes Decision"; IEEE Transactions on circuits & systems; vol. 38, No. 9, Sep. 1991, pp. 1003–1020.
Gabbouj et al, "Minimax Stack filtering in a parameterized Environment"; 1992 IEEE Int. Symposium on Circuits & Systems, pp. 97–100 vol. 1.
Lin et al, "Minimum Mean Absolute . . . Stack filter"; IEEE Transactions on Acoustics, Speech & Signal Processing, vol. 38 No. 4, pp. 663–678.
Feldman et al, "Example–guided optimizations of reversing domain theories" AI applications, 1991 Conference, pp. 240–244.
Barner, "C–Stack Filters"; 1991 Int. Conf. on Acoustics, Speech and Signal Processing pp. 2005–2008 vol. 3.

*Primary Examiner*—David K. Moore
*Assistant Examiner*—Tariq Rafiq Hafiz
*Attorney, Agent, or Firm*—Ray G. Wilson; William R. Moser; Paul A. Gottlieb

[57] ABSTRACT

Stacked generalization is used to minimize the generalization errors of one or more generalizers acting on a known set of input values and output values representing a physical manifestation and a transformation of that manifestation, e.g., hand-written characters to ASCII characters, spoken speech to computer command, etc. Stacked generalization acts to deduce the biases of the generalizer(s) with respect to a known learning set and then correct for those biases. This deduction proceeds by generalizing in a second space whose inputs are the guesses of the original generalizers when taught with part of the learning set and trying to guess the rest of it, and whose output is the correct guess. Stacked generalization can be used to combine multiple generalizers or to provide a correction to a guess from a single generalizer.

6 Claims, 4 Drawing Sheets

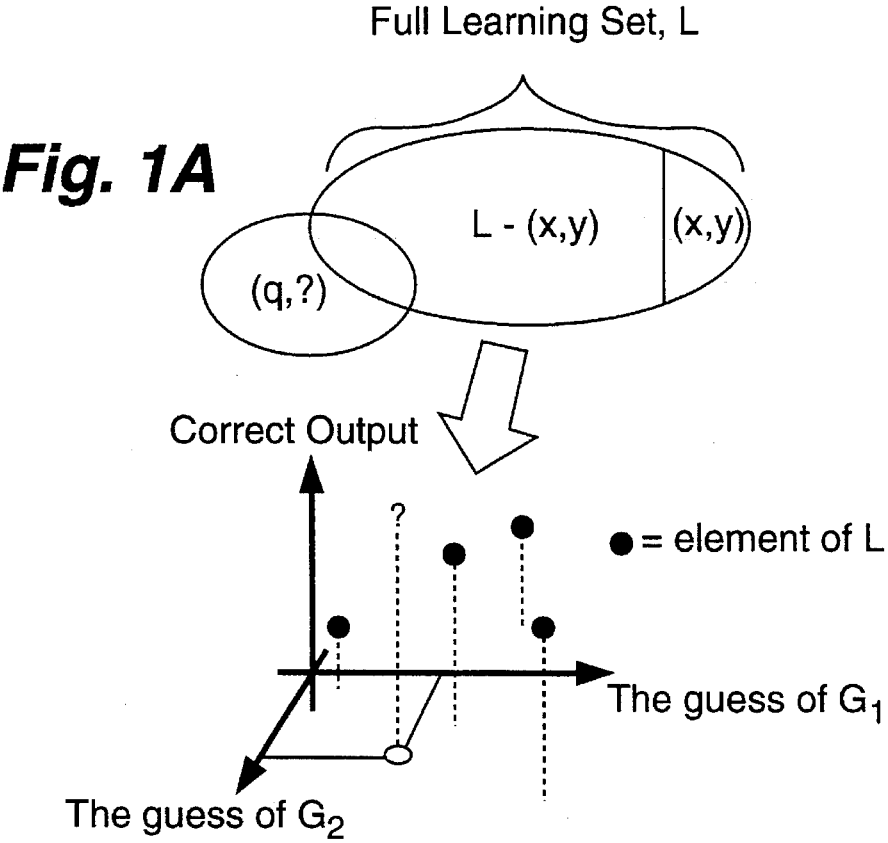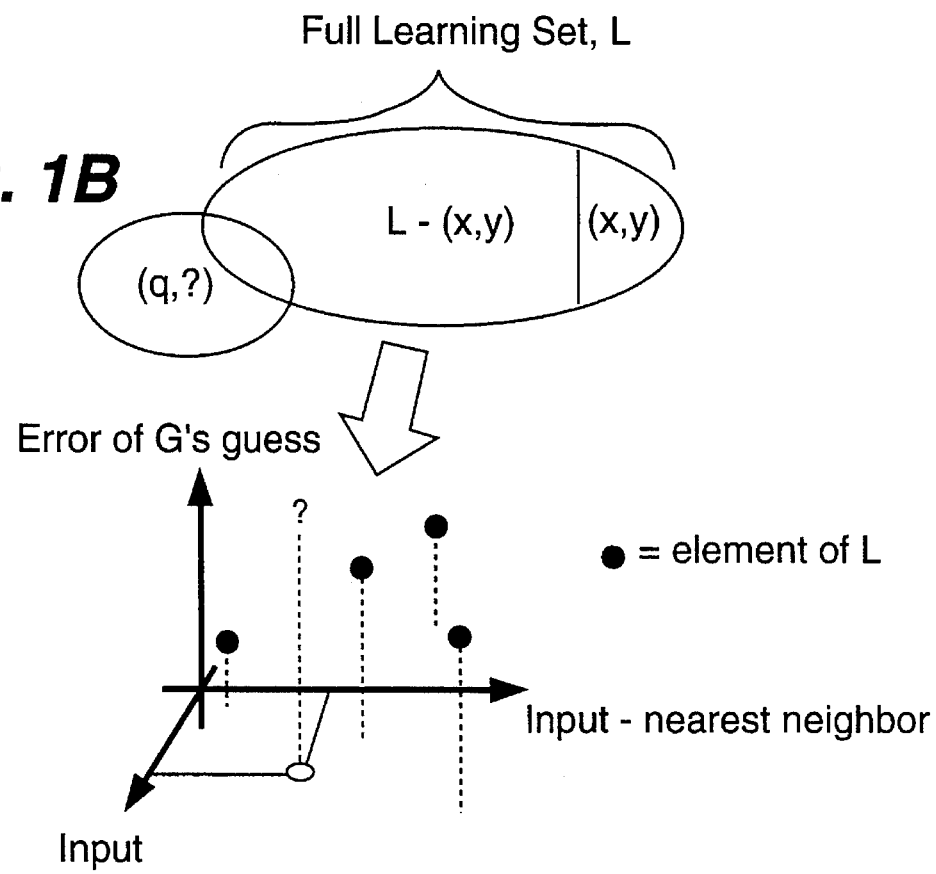

1) Creating L'

Level 1/
Learning set L'. Contains r elements, one for each partition in the level 0 partition set.

Level 0/
Learning set θ. Partition set $θ_{ij}$. Generalizers ($G_p$).

$G_1(θ_{i1}; in(θ_{i2}))$    $G_2(θ_{i1}; in(θ_{i2}))$    ;    $out(θ_{i2})$

2) Guessing

Level 1/
Learning set L'. Generalizer G'. Question q'.

Level 0/
Learning set 0. Generalizers ($G_p$). Question q.

$G_1(θ; q)$    $G_2(θ; q)$    .... ;

METHOD FOR GUESSING THE RESPONSE OF A PHYSICAL SYSTEM TO AN ARBITRARY INPUT

This case is a continuation-in-part of U.S. patent application Ser. No. 08/035,326 filed Mar. 23, 1993 now abandoned.

BACKGROUND OF INVENTION

This invention relates to the deduction of a functional relationship between an input and an output and, more particularly, to the optimization of one or more generalizers of a physical system to deduce outputs from inputs. This invention was made with government support under Contract No. W-7405-ENG-36 awarded by the U.S. Department of Energy. The government has certain rights in the invention.

The fundamental problem in supervised machine learning is to infer a "parent" function f taking input values x to output values y, given a known training set of x-y pairs which are samples of f. Applications of this problem occur in, e.g., learning to read hand-written characters, learning to recognize spoken speech, and deducing a 3-D amino acid structure from an arbitrary amino acid sequence. As used herein, any algorithm that takes in a training set of values and outputs a guess of the function that generated the training set is a "generalizer." The generalizer uses the training set to create a function h, which is its guess for function f; the generalizer's guess for the output corresponding to an input question q is given by h(q).

Some examples of generalizers are back-propagated neural nets (D. E. Rumelhart et al., *Explorations in the Microstructure of Cognition,* Vol. I and II, MIT Press (Cambridge, Mass. 1986)); classifier systems (J. Holland, *Adaptation in Natural and Artificial Systems,* University of Michigan Press (Ann Arbor, Mich. 1975)); and various uses of the minimum description length principle (J. Rissanen, "Stochastic Complexity and Modeling," 14 The Annals of Statistics, pp. 1080–1100 (1986)). Other important examples are memory-based reasoning schemes (C. Stanfill, "Toward Memory-based Reasoning," 29 Communications of the ACM, pp. 1213–1228 (1986); regularization theory (T. Poggio et al., "MIT Progress in Understanding Images," in L. Bauman (Ed.), *Proceedings of the Image Understanding Workshop,* pp. 111–129 (McLean, Va. 1988); and similar schemes for overt surface fitting of a parent function to the learning set (e.g., D. Wolpert, "A Benchmark for How Well Neural Nets Generalize," 61 Biological Cybernetics, pp. 303–313 (1989)).

For any real-world learning set $\theta$, there are always many possible generalizers $\{G_j\}$ that might be used to extrapolate from $\theta$. The implicit problem is how to address this multiplicity of possible generalizers. Most algorithm schemes for addressing this problem, including, in particular, nonparametric statistics techniques like cross-validation, generalized cross-validation, and bootstrapping, are winner-take-all strategies. These schemes can be viewed as mappings that take an arbitrary generalizer and learning set as input, and give as output an estimate of the average generalizing accuracy of that generalizer for the unknown parent function that generated the learning set. To exploit such a mapping, one simply picks that $G \in \{G_j\}$, which, together with $\theta$, has the highest estimated generalization accuracy according to the mapping, and then uses that G to generalize from $\theta$.

Thus, conventional strategies provide only a means of estimating the generalization accuracy of a single generalizer. It would be desirable to improve the accuracy of the generalization rather than just estimate the accuracies of some generalizers The present invention provides improved accuracy in the output guesses by introducing a second generalizer that is "fed" by the first generalizer or generalizers and which infers a function to improve the output guess of the first generalizer or generalizers. If one generalizer is used, the second generalizer either infers an error for correcting the output guess of that generalizer or infers a correct guess. If several generalizers are used, the second generalizer infers a function for combining the outputs from the first generalizers to minimize error in the resulting combined guess, or infers a function relating the output guesses to the error for some single generalizer.

Accordingly, one object of the present invention is to obtain improved guesses of outputs from inputs for the physical system.

Another object of the present invention is to combine generalizers to provide improved accuracy in the guess for the output of the physical system corresponding to a given input value "question".

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method of this invention may comprise a process for estimating an output response of a physical system to an arbitrary input where there is a known set of input values and related output values. A computer is programmed with a first program having a set of one or more generalizers to learn one or more first level relationships between the input values and the related output values. The known set of input values and related output values is partitioned into first and second subsets. The first program is run repetitively on the computer using input values from the first subset to generate guessed output values to define the one or more learned first level relationships. The first level relationships are then stored in the computer. Input values in the second subset are input to the first level relationship stored in the computer to generate second guessed output values. The second guessed output values are stored in the computer. A first set of defined values having a specified relationship with the second guessed values, the input values in the second subset and the input and output values in the first subset is specified. A set of second defined values having a specified relationship with the second guessed output values and the related output values in the second subset is defined. The computer is programmed with a second program having a second generalizer to represent a second level relationship between the first defined values and the second defined values. The second program is run repetitively on the computer using the first defined values as input values and the second defined values as output values to learn the second level relationship. The first level relationship and the second level relationship are stored in a stack arrangement effective to form a computer learned relationship for predicting the response of the physical system to an arbitrary input. An arbitrary input value for the physical system is input to the computer-learned relationship and an output value of the system is guessed from the stored relationship.

In another characterization of the present invention, a computer implemented method determines a computer-learned relationship between arbitrary input values and related output values from a physical system where there is a known set of input values and related output values for the physical system. A first generalizer is provided in a computer to learn a first level relationship between the input values and the related output values. The known set of input values and related output values is partitioned into first and second subsets. The first generalizer is taught on the computer using input and output values from the first subset to generate guessed output values for the related input values in the first subset to define the first level relationship. The first level relationship is stored in the computer. Input values in the second subset are input to the first level relationship stored in the computer to generate second guessed output values. The second guessed output values are stored in the computer. A first set of defined values having a specified relationship with the second guessed values, the input values in the second subset and the input and output values in the first subset is specified. A set of second defined values having a specified relationship with the second guessed output values and the related output values in the second subset is defined. A second generalizer is provided in the computer to learn a second level relationship between the first and second defined values. The second generalizer is taught on the computer using the first defined values as input and second defined values as output to define the second level relationship. The first level relationship and the second level relationship are stored in a stack arrangement effective to form the computer-learned relationship to produce output values generated by the physical system from input values outside the known set of input values and related output values.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 1A AND 1B graphically depict the application of stacked generalizers to combine generalizers and to improve a single generalizer, respectively.

DETAILED DESCRIPTION OF THE INVENTION

In accordance with the present invention, a computer-implemented method is provided for selecting a stacked set of generalizers having an improved accuracy over individual generalizers in guessing the response of a physical system to an input where the generalizer or generalizers are trained from a known set of input-output values generated by the physical system. While generalizers can be found readily that will correctly guess output values from input values in the training set, the usefulness of the generalizer is to accurately guess an output from input values, particularly for input values that are outside the training set. As described herein, stacked generalizers are used to achieve a generalization accuracy, as opposed to a training accuracy, that is as high as possible.

Figure 4:
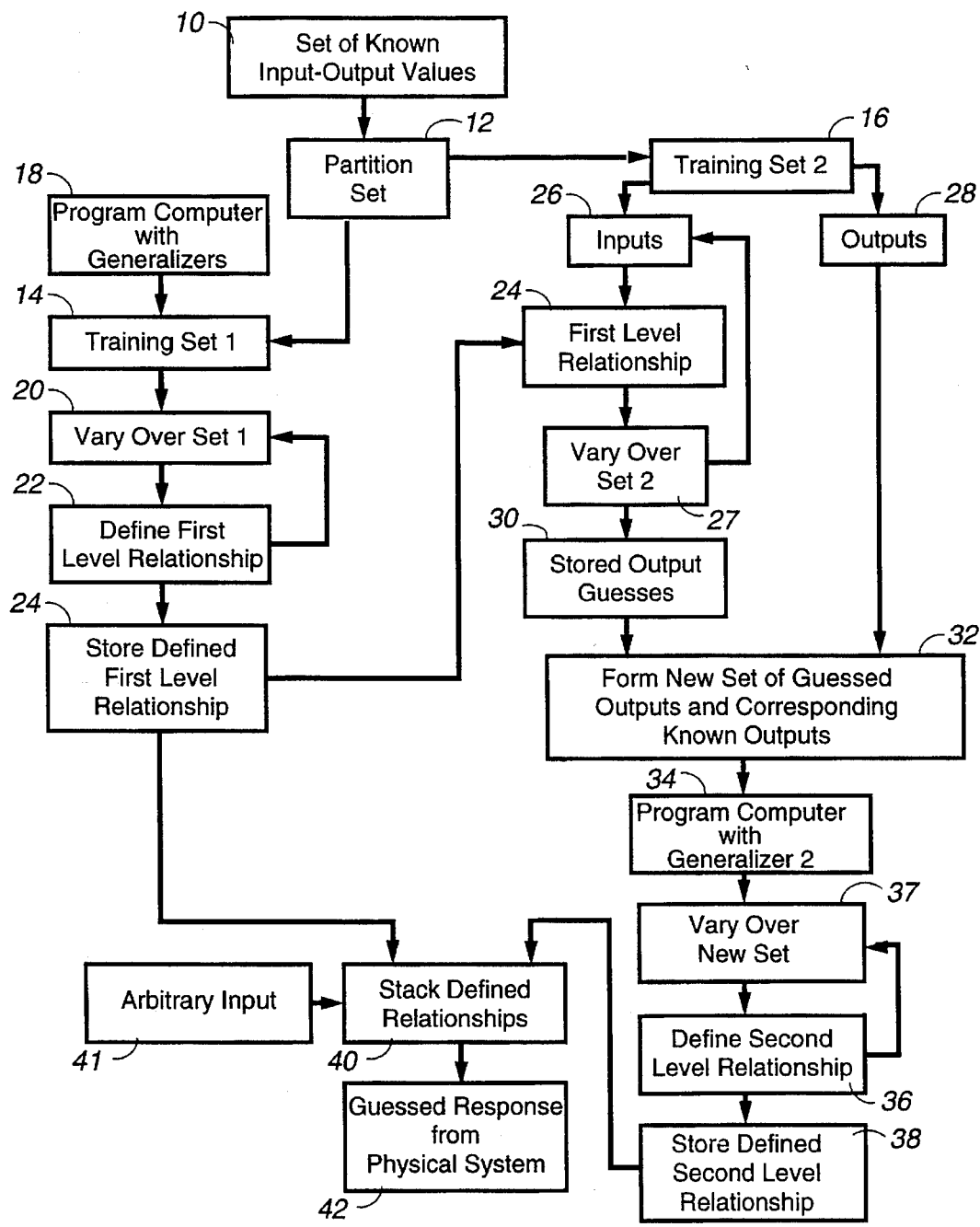
FIG. 4 is a flow diagram of one embodiment of the present invention for determining the response of a physical system to an arbitrary input.

FIG. 4 is a flow diagram of one embodiment of the present invention for guessing the response of a physical system to an arbitrary input. Given a known set of input-output values 10 representing the known response of a physical system to a known input as a training set, the known set is partitioned 12 to create a first subset 14 and a second subset 16. The terms "known set", "training set", and "learning set" are used synonymously herein. One or more first generalizers are then programmed 18 into a computer. The program is run repetitively 20, 22 as the inputs are varied over the first subset 14 as a training set 14 to train the first one or more generalizers to define 22 one or more first level relationships that determine the output response of the physical system to the known inputs. The defined first level relationship guesses for the system may be the setting of various parameters in the generalizers, e.g., exponential decay values, values for constants, periodical response times, etc., or may be simply the actual guess for the output responses to the input. The defined first level relationships are stored 24.

The second subset 16 is used to provide inputs 26 to defined first level relationships 24. The inputs 26 are varied 27 over the second subset to provide output guesses 30, which are stored in the computer.

The computer is then programmed with a second generalizer 34 to represent a second level relationship. The second level relationship may be defined by creating a second training set 32 comprising the stored output guesses 30 as second level inputs and the true associated output responses 28 that correspond to the inputs 26 that generated stored output guesses 30 using the defined first level relationship relationships 24 as second level outputs. The second program is run repetitively 37 over the set of stored output guesses 30 to define the second level relationship 36 between the second levels inputs 30 and the known response outputs 28 from the physical system. The defined second level relationship is stored 38. In this instance, the stored output guesses 30 form first defined values for input to the second generalizer and the true known response outputs 28 form second defined values as the output from the second generalizer for use in defining the second level relationship 36.

The stored defined first level relationship 24 is combined, or stacked, 40 with the stored defined second level relationship 38 to form a complete computer learned relationship between arbitrary inputs to a physical system and the response of the physical system. The stacked defined generalizers 40 are now used to accept arbitrary inputs 41 and provide a guessed response 42 from the physical system being investigated. In this stack configuration, an input is provided to the stacked relationships, whereby the first defined relationship provides a first level relational output for input to the second defined relationship; the second defined relationship then provides a guessed output for the response of the physical system.

As used herein, the term "correctly guess" an output means to correctly guess the output directly or to guess the error associated with the output of a particular generalizer. The reference to outputs from first generalizers includes output guesses of the generalizers and other information from the original training set, e.g., the distance between an input and its nearest neighbor in the training set.

As further used herein, the term "programming a computer with a program having one or more generalizers" means to input a program that performs the algorithm represented by the generalizer. To "define a relationship" or to "train a generalizer" means, e.g., to repetitively run a program to form outputs in response to inputs that are varied over a set of known or defined values.

An example of the use of stacked generalization to combine generalizers is shown in FIG. 1A. Two generalizers, $G_1$ and $G_2$ are depicted. The learning set L is represented figuratively by the full ellipse. A question q lying outside of L is also indicated. L is partitioned into two portions: one portion consists of the single input-output pair (x,y), and the other portion contains the rest of L. Given this partition, both $G_1$ and $G_2$ are trained on the portion $\{L-(x,y)\}$. Then both generalizers are asked the question x; their answers are $g_1$ and $g_2$.

In general, since the generalizers have not been trained with the pair (x,y), both $g_1$ and $g_2$ differ from y. Therefore, a new relationship is established: when $G_1$ guesses $g_1$ and $G_2$ guesses $g_2$, the correct answer is y. This information is cast as input-output information in a new space (i.e., as a single point with the 2-dimensional input $(g_1, g_2)$ and the output (y). Choosing other partitions of L gives other such points. Taken together, these points constitute a new learning set, L'.

Now $G_1$ and $G_2$ are trained on all of L and are then asked the question q, which may be outside L. The answers are inputted to a third generalizer that has been trained on L'. The guess from the third generalizer is the output that corresponds to the question q.

FIG. 1B graphically depicts the use of stacked generalization to improve a single generalizer, G. As in FIG. 1A, a learning set L is represented figuratively by the full ellipse, a question q lies outside of L, and L is partitioned into two portions, as above. G is trained on the portion $\{L-(x,y)\}$ and then asked the question x. The output is both a guess g and the vector $\xi$ from x to its nearest neighbor in $\{L-(x,y)\}$.

In general, since G has not been trained with the pair (x,y), g will differ from y. Therefore, a new relationship is established: when the question is x, and the vector from x to its nearest neighbor is $\xi$, the correct answer differs from G's guess by (g-y). Choosing other partitions of L provides other such information, which, when recast as input and output points, constitutes a new learning set L'.

G is now trained on all of L and then asked the question q. The vector $\xi$ from q to its nearest neighbor in L is found. The pair of $(q,\xi)$ is then input to a second generalizer that has been trained on L'. The guess of the second generalizer is the guess for the error G has in guessing the output corresponding to q. Combining the error with G's guess provides the output corresponding to q.

Generalizers

When the input space is $R^n$ and the output space is $R^{n+1}$, a generalizer is a mapping that takes {a learning set of m pairs $\{x_k \epsilon R^n, y_k \epsilon R\}$, $1 \leq k \leq m$ together with a question $\epsilon R^n$} into {a guess $\epsilon R$}. For a given n, such a mapping is equivalent to a countably infinite set of functions $\{g_i\}$, $1 \leq i \leq \infty$, one function for each possible value of m. The function $g_1$ takes three arguments (the learning set input $x_1$, the learning set output $y_1$, and the question q); $g_2$ takes five arguments $(x_1, y_2, x_2, y_2,$ and q) and so on. Often the $\{g_i\}$ are only implicitly defined in the definition of the generalizer's algorithm. This is the case for neural net back propagation, for example. In other generalizers (e.g., generalizers which work by explicitly fitting a surface), it is possible to write down the $\{g_i\}$ directly. Colloquially, one says that a generalizer's $g_m$, when provided with the argument list $\{x_1, y_1, x_2, y_2, \ldots, x_m, y_m; q\}$ is being "taught" or "trained" with an m-element learning set consisting of the elements $\{x_1, y_1, x_2, y_2, \ldots, x_m, y_m\}$, and is then "asked" the question q, for which it "guesses" what the corresponding output should be. Given a particular training set on which a generalizer has been trained, the mapping from questions to guesses is a learned relationship. If the generalizer returns the appropriate $y_i$ whenever q is equal to one of the $x_i$ in the learning set, the generalizer is said to reproduce the learning set.

As herein discussed, consider a learning set θ of m elements each living in the space $R^{n+1}$. Together with θ there is given a set of N generalizers $\{G_j\}$, where $N \geq 1$ (i.e., there are N separate sequences of functions $\{g_i\}$). The following nomenclature will be used:

G(θ;q)—output of the generalizer G's m-th function, $g_m$ (where m is the number of elements in the provided learning set θ), taking as an argument list the enumerated elements of θ followed by the question q.

"input component" of a point—the input space projection of a point in the full input/output space $R^{n+1}$.

"nearest neighbor"—nearest neighbor of a point as measured in the input space projection of the full space.

The first step in employing stacked generalization is choosing a set of r partitions, each of which splits θ into two (usually disjoint) sets. Label each such set of partitions as $\theta_{ij}$, where $1 \leq i \leq r$, and $j \epsilon \{1,2\}$. Such a set of partitions is called a partition set. For example, for a cross-validation partition set (CVPS), r=m; for all i, $\theta_{i2}$ consists of a single element of θ; the corresponding $\theta_{i1}$ consists of the rest of θ; and $\theta_{i2} \neq \theta_{j2}$ for i≠j. One pair of such a CVPS is illustrated in both FIGS. 1A and 1B.

Stacked Generalization

Define the $R^{n+1}$ space inhabited by the original learning set θ as the "level 0 space." Any generalizer when generalizing directly off of θ in the level 0 space is called a "level 0" generalizer, and the original learning set is called a "level 0" learning set. The input-output relationship produced at a level 0 generalizer when trained on a level 0 training set is a first level relationship. For each of the r partitions of θ, $\{\theta_{i1}, \theta_{i2}\}$, look at a set of k numbers, i.e., a first defined set of values, determined by (a subset) of the N $\{G_j\}$ working together with that partition. Typically these k numbers can be things like the guesses made by the $\{G_j\}$ when taught with $\theta_{i1}$ and presented as a question, the input component of the element $\theta_{i2}$ (i.e., $G_j (\theta_{i1};$ the input component of $\theta_{i2}))$, the input component of the element $\theta_{i2}$, or the vector in the input space connecting the input component of $\theta_{i2}$ to its nearest neighbor in $\theta_{i1}$. Take each such set of k numbers and view it as the input component of a point in a space $R^{k+1}$. The corresponding output value of each such point, i.e., a second defined value, has a specified relationship with the output component of the corresponding $\theta_{i2}$, perhaps along with $G_j (\theta_{i1};$ the input component of $\theta_{i2})$ for one of the $\{G_j\}$. This space $R^{k+1}$ is called the "level 1 space." Since there are r partitions of θ, we have r points in the level 1 space. Those r points are known as the "reduced" or "level 1" learning set. The level 1 learning set is formed from corresponding pairs of the first and second defined sets of values. In FIGS. 1A and 1B, the level 1 learning set is the elements of L'.

It is desired to generalize from θ by operating a generalizer in the level 1 space. One way is to take a question in the level 0 space, pass it through the transformations that produced the input components of the level 1 learning set to get a level 1 question in the level 1 input space, and then answer that level 1 question by generalizing from the level 1 learning set. The mapping from the level 0 guesses to the level 1 guesses produced by the level 1 generalizer in response to the level 1 learning set is known as a "second level relationship". This level 1 guess is then transformed back into a level 0 guess. The transformations are determined by how the output components of the $\theta_{i2}$ are used to calculate the output components of the level 1 learning set. The transformation is known as "stacking" and the stacked first and second level relationships are effective to form the learned relationship between an input to the physical system and the output of that system. Any generalizing process of this form is known as "stacked generalization." The process as a whole can be iterated, resulting in levels p>1 (i.e., multiple stackings).

It will be appreciated that the choice of level 0 and level 1 generalizers is not subject to set rules, but is within the experience of persons working in the field of machine learning. Examples of various generalizers are set out above and the selection of a particular generalizer(s) for any given set of $\theta$ can be determined by selecting ones appropriate to the $\theta$.

Figure 2A:
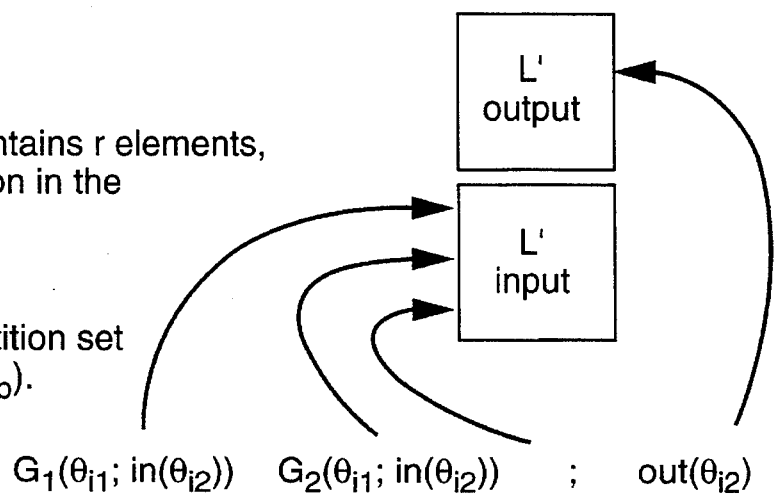
FIGS. 2A AND 2B depict the steps in providing stacked generalizers.
Figure 2B:
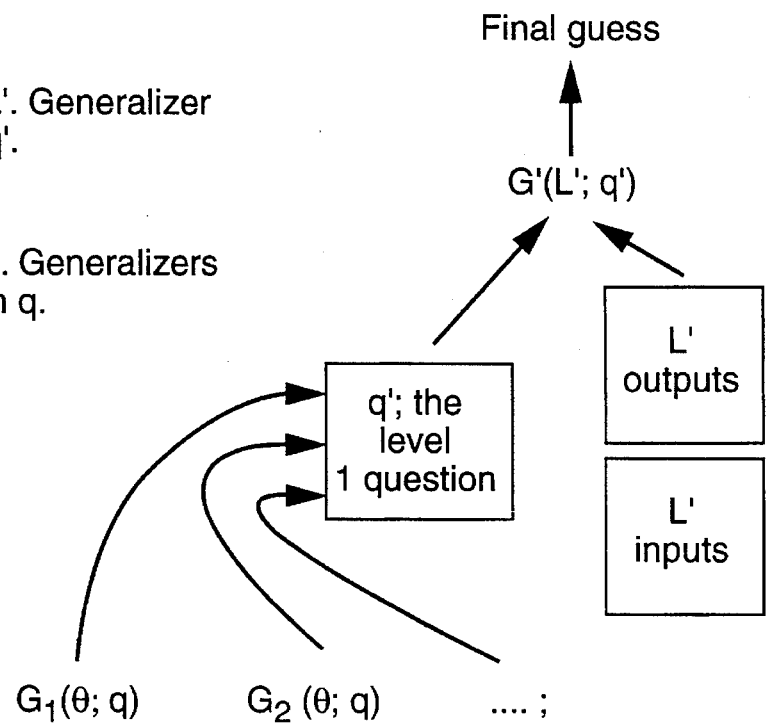

FIGS. 2A and 2B depict the two stages involved in the implementation of stacked generalization. FIG. 2A depicts the creation of the level 1 learning set L' from the level 0 partition set $\theta_{ij}$ and the set of level 0 generalizers $\{G_p\}$. In the second stage depicted in FIG. 2B, the same architecture is used to create a level 1 question from a level 0 question. The final guess is found by training the level 1 generalizer on L' and then asking it the new-found level 1 question.

Referring first to FIG. 2A, assume an m-element learning set $\theta$ of points living in $R^{n+1}$, a set of N generalizers $\{G_j\}$, and a question $q \in R^n$. For purposes of illustration, consider only the CVPS, discussed above. This partition set gives m subsets $\{\theta_{i1}, \theta_{i2}\}$, where each $\theta_{i1}$ is a different subset of m−1 of the elements of $\theta$, and $\theta_{i2}$ is the remaining element of $\theta$. Let k=N, and let the k=N numbers used to construct the input components of an element of the level 1 learning set be the guesses made by all N of the $\{G_j\}$ when taught with a particular $\theta_{i1}$ and presented with the input component of the corresponding $\theta_{i2}$ as a question. In other words, a particular point in the level 1 learning set is stored as the N components of its input projection set to the N numbers $G_j(\theta_{i1})$.

Let the output component of a point in the level 1 learning set be given directly by the output component of the corresponding $\theta_{i2}$. Since there are r=m partitions of $\theta$, there are r=m elements in the stored level 1 learning set, just like in the level 0 learning set. Since k=N, each point in this level 1 learning set has an N-dimensional input component; the level 1 space is $R^{N+1}$.

FIG. 2B depicts the process to make a guess for a question, q, that might be outside the learning set L. To make a guess for the level 0 question, q, convert the question to a level 1 question: find the guess made in response to the question q by all N of the $\{G_j\}$ when taught with the full learning set $\theta$. These N guesses provide the input coordinates of a question in the level 1 space; the corresponding level 1 output guess is found by training the level 1 generalizer on the level 1 learning set and asking it that level 1 question. The guess for the level 1 output corresponding to the level 1 question is taken as the guess made by the entire stacked generalization process for the level 0 output that corresponds to the original level 0 question.

The guess made by this implementation of stacked generalization is determined by combining the guesses of the original $N\{G_j\}$. How they are combined depends on the level 1 generalizer used. For example, consider the following level 1 generalizer: "Fit the (level 1) learning set with a single global hyperplane of the form {output=value of input dimension t}. There are k such global hyperplane fits for the k possible values of t; choose the hyperplane fit with the smallest RMS Euclidean error for fitting the (level 1) learning set." In the language of pattern recognition, this generalizer is the rule "find which single feature has the greatest correlation with the correct answer, and guess according to that feature." This level 1 generalizer results in a winner-take-all strategy for using the $\{G_j\}$. A computer is programmed with this generalizer to make a determination of which of the $\{G_j\}$ to use by finding the $G_j$ with the minimal RMS error for predicting part of the level 0 learning set (i.e., $\theta_{i2}$) that have been trained on the rest (i.e., $\theta_{i1}$). This error can be calculated using the CVPS.

For example, let n=3, where the learning set consists of m elements of the form (a, b, c, output=a+b+c), where a, b, and c are integers. A "correct" generalization would then guess the parent function {output=sum of the three input components}. Consider a learning set $\theta$ consisting of the five input-output pairs (0, 0, 0; 0), (1, 0, 0; 1), (1, 2, 0; 3), (1, 1, 1; 3), (1, −2, 4; 3), all sampled with no noise from the parent function. Label these five input-output pairs as $\theta_{12}$ through $\theta_{52}$, i.e., the set $\theta$, and define $\theta_{i1}=\theta-\theta_{i2}$. There are two level one generalizers, $G_1$ and $G_2$, and a single level 1 generalizer $\Gamma$. The level 1 learning set L' is given by the five input-output pairs ($G_1(\theta_{i1}$; input components of $\theta_{i2})$, $G_2(\theta_{i1}$; input components of $\theta_{i2})$, output components of $\theta_{i2}$) given by the five possible values of i. This level 1 space has two dimensions of input and one of output. For example, the member of the level 1 learning set corresponding to i=1 has output component 0 and input component $G_1(\theta_{11}; (0, 0, 0)), G_2(\theta_{11}; (0, 0, 0))$. Now take a level 0 question $(x_1, x_2, x_3)$. The final guess is $\Gamma(L'; (G_1(\theta; (x_1, x_2, x_3)), (G_2(\theta; (x_1, x_2, x_3)))$ (i.e., $\Gamma$ is trained on L' and then asked the question given by the guesses of the two level 0 generalizers which were themselves trained on all of $\theta$ and then asked the question $(x_1, x_2, x_3)$).

There is no a priori reason why the k numbers used to make the level 1 input space have to all be the guesses of a set of generalizers. Nor is there any a priori reason why the output components of the level 1 learning set have to be given directly by the output components of the $\theta_{i2}$. Rather, the crucial aspect of stacking is the use of a partition set to correct for the bias of one or more generalizers.

This can be illustrated with an example of how to use stacked generalization when the set $\{G_j\}$ consists of a single element (i.e., by an example of how to improve the behavior of a single generalizer, rather than using it as a means of combining a set of generalizers), as shown in FIG. 1B. The CVPS is used, so r=m. The level 0 input space has dimension n; let k=2n. The 2n numbers defining the level 1 input space are the n coordinates of a level 0 question (like the input components of $\theta_{i2}$) together with the n input coordinates of the vector connecting the nearest neighbor of that question among the level 0 learning set to the question itself.

The single generalizer does not in any way contribute to the level 1 input space values. Rather, G comes in, indirectly, in the level 1 space outputs; the output component of a point in the level 1 space is the error of G when trying to guess what output corresponds to the associated level 0 question. For example, in forming the level 1 learning set, set the output value corresponding to a particular partition $\{\theta_{i1}, \theta_{i2}\}$ to be $\{G(\theta_{i1};$ input components of $\theta_{i2})-$(the output component of $\theta_{i2})\}$.

To make a guess as to what output should correspond to the question q, after the level 1 training set is constructed, G is trained with all of θ and asked the question q, whose answer is y. Then the pair (q, vector from q to the nearest element of the training set) is constructed as level 1 input coordinates of a level 1 question. A new level 1 generalizer is now trained on the level 1 pairs. Generalizing in this level 1 space, the level 1 generalizer makes a guess for what level 1 output should correspond to the level 1 question (i.e., an estimate for the difference between y and the correct guess). This guess may be multiplied by some number, e.g., one half, and subtracted from y to get a final guess for the output that corresponds to the original question q. It should be noted that the use of a multiplier provides a control on "how much" stacked generalization is being used, where a value of 0 corresponds to using only the level 0 generalizer and a value of 1 provides a guess that is completely based on stacked generalization.

Figure 3B:
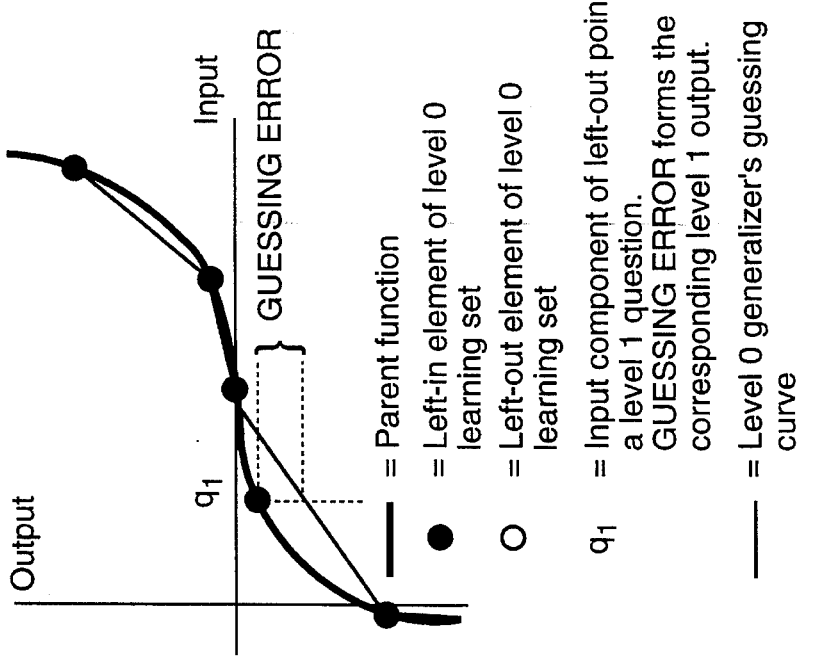
FIGS. 3A, 3B, AND 3C graphically depict the application of stacked generalizers to improve the guessing of a single generalizer.
Figure 3A:
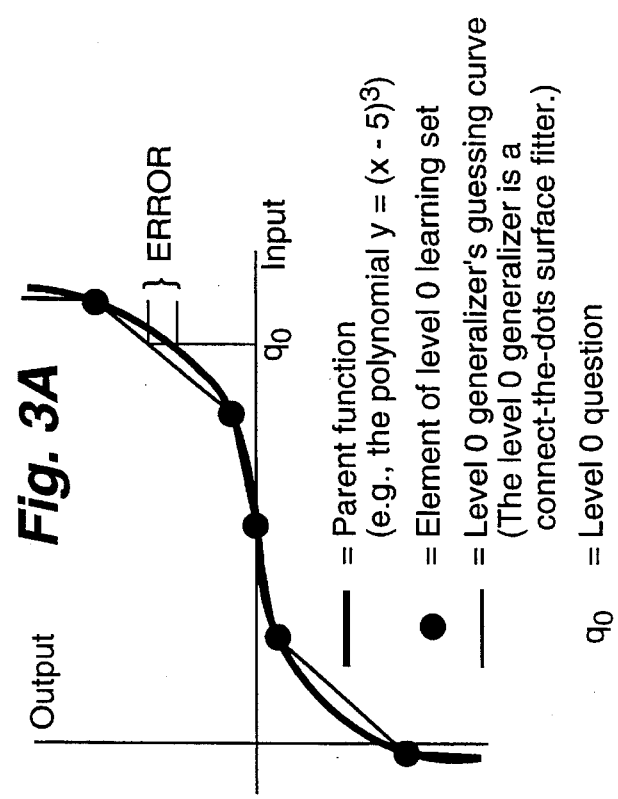
Figure 3C:
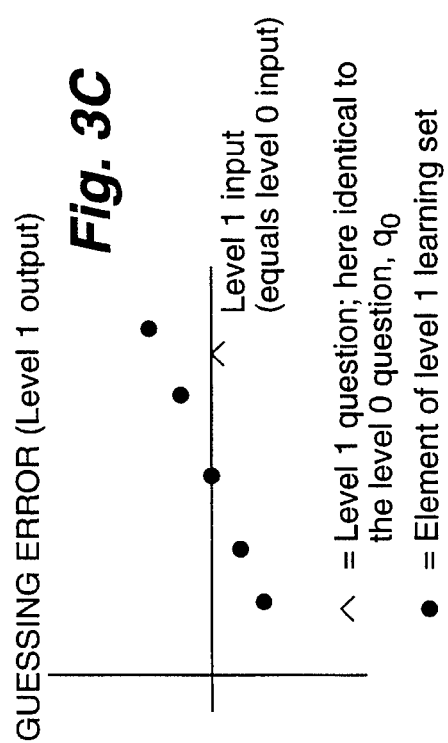

FIGS. 3A, 3B, and 3C illustrate the application of stacked generalization to improve the guessing of a single generalizer. As depicted, the level 1 inputs are one-dimensional, consisting solely of the level 0 inputs. FIG. 3A depicts a parent function and part of a training set made up of some noise-free samples of that parent function. The level 0 generalizer is programmed to form a simple connect-the-dots generalizer; its guessing for the learning set is explicitly depicted. A particular question is indicated by $q_o$. A second, level 1 generalizer must be defined to correct for the error of the level 0 generalizer.

FIG. 3B depicts forming the level 1 learning set. A CVPS of the original level 0 learning set is used with the stored first level relationship defined by the level 0 generalizer to form second guessed output values for the level 1 training set. One partition pair from this CVPS is illustrated in FIG. 3B. The point in the learning set corresponding to the hatched circle is $\theta_{i2}$; the level 0 generalizer is trained on all other points of the level 0 learning set. The level 0 generalizer's error at guessing what output corresponds to the input component of $\theta_{i2}$ (i.e., corresponding to $q_1$) is tabulated. This error is the output of a point in the level 1 learning set; the corresponding level 1 input is the same as the level 0 input, $q_1$.

FIG. 3C depicts some elements of the level 1 learning set, which was made according to the process described for FIG. 3B. The full stacked generalization scheme works by first using a generalizer to guess what level 1 output should correspond to the level 1 question (which is identical to the level 0 question), given the input-output pairs of the level 1 learning set. After this guess z is found, the level 0 generalizer's guess y is found for the output corresponding to the level 0 question. The final guess is y−(z/2).

In order to verify the efficacy of stacked generalization, numerical experiments were run. The following experiments use the HERBIE generalizer described in D. Wolpert, "Constructing a Generalizer Superior to NET-talk via a Mathematical Theory of Generalization," 3 Neural Networks, pp. 445–452 (1990). The HERBIE works by returning a normalized weighted sum of the outputs of the p nearest neighbors of the question among the learning set. For example, for p=3, with a weighting factor for each of the 3 nearest neighbors as the reciprocal of the distance between that neighbor and the question, the "normalized weighted sum" is the weighted sum divided by the sum of the weighting factors to yield a guess=$\{\Sigma^3_{i=1} y_i/d(q,x_i)\}/\{\Sigma^3_{i=1} 1/d(q,x_i)\}$, where q is the question, $x_1, x_2, x_3$ are the input components of the three nearest neighbors of q in the learning set; $y_1, y_2, y_3$ are the corresponding outputs; and d(.,.) is a metric.

Experiment One

Stacked generalization is used to improve the performance of a single generalizer. The level 0 input space was one-dimensional. The problem was explicitly one of surface-fitting; the particular parent functions were simple functions, and the level 0 generalizer was a connect-the-dot generalizer as discussed in FIGS. 3A–C, above.

The stacked generalization architecture discussed is that of FIG. 1B with n=1, so that the level 1 input space was two-dimensional. The level 1 generalizer was a HERBIE, discussed above, using the Euclidean metric. A series of 1,000 third order polynomials were selected as parent functions with coefficients chosen randomly from the interval [−2.0, 2.0]. For each polynomial parent function, a 100-point learning set was chosen with random input space values, and then a separate 100-point testing set of random input space values was chosen. Both sets had their input space values restricted to the interval [−10.0, 10.0].

The learning set was used to "train" the stacked generalization structure and errors when using that structure to guess the outputs of the elements of the testing set were recorded and compared to the errors of the level 0 generalizer run by itself with no level-1 post-processing. The improvement in the use of stacked generalization was characterized by the average of the ratio {(square of the error for the level 0 generalizer run by itself)/(square of the error for the stacked generalizer)}. This average was 1.929 with an error of ±0.0243; i.e., an improvement of about 2.

Experiment Two

The problem is the NETtalk "reading aloud" problem with a parent function having seven (suitably encoded) letters as input. The output of the parent function is the phoneme that would be voiced by an English speaker upon encountering the middle letter if all seven letters had occurred in the midst of some test which the speaker was reading aloud. See, e.g., Wolpert, supra. NETtalk is a neural net which takes (a suitable encoding of) a 7-letter input field as its input, and guesses a vector in a 21-dimensional space. This vector guess is then converted into a phoneme guess by finding the legal phoneme vector making the smallest angle (in the 21-dimensional space) with the guessed vector.

To use HERBIEs for this problem, 21 such HERBIEs have to be used, one for each component of the phoneme vector space. The guesses of these 21 HERBIEs are then combined to form a 21-dimensional guess, which in turn specifies a phoneme guess. As used in this example, the term "HERBIE" means the set of 21 such HERBIEs combining to guess a phoneme.

Several separate generalizers were combined as discussed for FIGS. 2A and 2B. Each such level 0 generalizer was a HERBIE, where four nearest neighbors were used (p=4). Each of these level 0 generalizers looked exclusively at a different one of the seven input letter slots, where p and q are 7-letter input vectors (i.e., for each of them, instead of using the full Hamming metric $d(p,q)=\Sigma^7_{i=1}(1-\delta(p_i,q_i))$, the metric $d(p,q)=(1-\delta(p_k,q_k))$, for some fixed value of k, was used). The level 0 generalizers differed from each other in which letter slot they looked at (i.e., different k's were used in the metric).

Three level 0 generalizers were used: the first looked exclusively at the third letter slot of the seven letter input field, the second looked exclusively at the fourth letter slot, and the third looked exclusively at the fifth letter slot. A CVPS was used, and the guesses of the level 0 generalizers formed the inputs of the level 1 space. The outputs of the level 0 and level 1 space were identical. The level 1 generalizer was a HERBIE using a full Hamming metric over the 3-dimensional level 1 input space. There were, in fact, 21 such HERBIEs, making a 21-dimensional guess, which in turn specified the phoneme guessed by the entire stacked generalizer.

The (level 0) learning set was made by looking at successive 7-letter windows of the first 1024 words (5114 elements) set out in E. Carterette et al., "Informal Speech," University of California Press, Los Angeles, Calif. (1974). The testing set was constructed from the successive 7-letter windows of the next 439 words (2189 elements). The three level 0 generalizers achieved a total of 507, 1520, and 540 correct guesses in the testing set for accuracies of 23%±0.90%, 69%±0.98%, and 25%±0.92% respectively The stacked generalizer got 1926 correct for an average accuracy of 88%±0.69%. These results demonstrate the ability of stacked generalization to manipulate relevant and relatively irrelevant information level 0 information in determining the correct phoneme output.

There are some properties of individual level 0 and level 1 generalizers that have particularly pronounced effects on the efficacy of stacked generalizations. Many generalizers are explicitly local, meaning the guess they make is overtly dependent in a very strong manner on the nearest neighbors of the question in the learning set. Many other generalizers, while not explicitly local, act locally. Care must be taken in using such a local generalizer with a CVPS, especially when the generalizer is being used by itself, i.e., when that generalizer is the only level 0 generalizer.

The reason for exercising such care is that for several of the i values, the element $\theta_{i2}=\theta-\theta_{i1}$ is one of the elements of $\theta$ which lie closest to the level 0 question. Therefore in trying to determine and correct for biases the level 0 generalizer will have when generalizing with the full learning set $\theta$, training is being done on learning sets with different nearby elements from the nearby elements in the full learning set. However, the generalizing of the local generalizer is strongly dependent on the set of nearby elements of the learning set, by hypothesis. Accordingly, the information in the level 1 learning set can be very misleading in how it implies the level 0 generalizer will err when answering the level 0 question via the full level 0 learning set. This problem is minimized if the level 1 input space contains information on the nearby elements of the level 0 learning set. Then, the dependence on the nearby elements of the learning set is being learned.

Care must also be taken in using stacked generalization when the level 1 inputs are given by the outputs of the level 0 generalizers. Then a poor choice of level 1 generalizer actually can result in generalization performance that is worse than that of the level 0 generalizers run by themselves. Some desirable traits of level 1 generalizers are the following:

(1) When the level 1 generalizer is explicitly a surface-fitter, best behavior accrues when that generalizer is relatively global, nonvolatile, and smooth, and not overly concerned with exact reproduction of the level 1 learning set.

(2) The level 0 generalizers should be "mutually orthogonal" so that each generalizer provides information not provided by other generalizers.

(3) The level 0 generalizers should be of various types, and not just simple variations of one another in order to fully examine the learning set and extrapolate information from it. If these constraints apply, the set of level 0 generalizers apply a nonlinear transformation from the learning set to the level 1 space that preserves all the important information in the level 0 learning set while not preserving redundant and irrelevant information.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A process for estimating a response of a physical system to an arbitrary input where there is a known set of input values and related output values, comprising the steps of:

programming a computer with a first program having at least one generalizer to learn at least one first level relationship between said input values and said related output values;

partitioning said known set of input values and related output values into first and second subsets;

repetitively running said first program on said computer using input and output values from said first subset to generate guessed output values to define said at least one first level relationship;

storing said at least one first level relationship in said computer;

inputting input values in said second subset to said at least one first level relationship stored in said computer to generate second guessed output values;

storing said second guessed output values in said computer;

inputting to said computer a set of first defined values having a specified relationship with said second guessed values, said input values in said second subset, and said input and output values in said first subset;

inputting to said computer a set of second defined values having a specified relationship with said second guessed output values and said related output values in said second subset;

programming said computer with a second program having a second generalizer to learn a second level relationship between said first defined values and said second defined values;

repetitively running said second program on said computer using said first defined values as input values and said second defined values as output values to learn said second level relationship;

storing said at least one first level relationship and said second level relationship in a stack arrangement effective to form a computer learned relationship for predicting said response of said physical system to an arbitrary input; and inputting to said computer-learned relationship an arbitrary input value for said physical system and guessing an output value for said physical system.

2. A process according to claim 1, wherein said at least one generalizer is one generalizer, said first defined values are the second guessed output values, wherein said second defined values are the error said one generalizer makes over said known set for guessing said known outputs in response to said known inputs.

3. A process according to claim 1, wherein said at least one generalizer is more than one generalizer, said first defined values are the second guessed output values, and said second defined values are said related output values in said second subset, wherein said second level relationship defines a function for combining outputs from said more than one generalizer to guess an output for inputs outside said known set.

4. A computer implemented method for determining a computer-learned relationship between arbitrary input values and concomitant output values from a physical system where there is a known set of input values and related output values, comprising the steps of:

programming at least one generalizer in a computer to learn at least one first level relationship between said input values and said related output values;

partitioning said known set of input values and related output values into first and second subsets;

teaching said at least one generalizer on said computer using input values from said first subset to generate guessed output values for said related output values in said first subset to form said at least one first level relationship;

storing said at least one first level relationship in said computer;

inputting to said computer a set of first defined values having a specified relationship with said second guessed values, said input values in said second subset, and said input and output values in said first subset;

inputting to said computer a set of second defined values having a specified relationship with said second guessed output values and said related output values in said second subset;

inputting input values in said second subset to said at least one first level relationship stored in said computer to generate second guessed output values;

storing said second guessed output values in said computer;

programming a second generalizer in said computer to learn a second level relationship between said first defined values and said second defined values;

teaching said second generalizer on said computer using said first defined values as input values and said second defined values as output values to learn said second level relationship;

storing said at least one first level relationship and said second level relationship to form said computer-learned relationship in a stacked arrangement effective to produce output values for said physical system from input values outside said known set of input values and related output values.

5. A process according to claim 1, wherein said at least one generalizer is more than one generalizer, said first defined values are the second guessed output values, and said second defined values are said related output values in said second subset, wherein said second level relationship defines a function for combining outputs from said more than one generalizer to guess an output for inputs outside said known set.

6. A process according to claim 1, wherein said at least one generalizer is one generalizer, said first defined values are the second guessed output values, wherein said second defined values are the error said one generalizer makes over said known set for guessing said known outputs in response to said known inputs.

* * * * *

UNITED STATES PATENT AND TRADEMARK OFFICE
CERTIFICATE OF CORRECTION

PATENT NO.  :  5,535,301

Issued  :  July 9, 1996

Inventor(s)  :  David H. Wolpert

It is certified that an error appears in the above-identified patent and that said Letters Patent is hereby corrected as shown below Cover Page, field [22], filing date, should be corrected to read:

Filed:  December 30, 1994

Cover Page, field [63], Related U.S. Application Data, should be corrected to read:

Continuation-in-part of Ser. No. 35,837

Signed and Sealed this

Twenty-eighth Day of January, 1997

Attest:

BRUCE LEHMAN

Attesting Officer    Commissioner of Patents and Trademarks